United States Patent

Shiga et al.

(10) Patent No.: US 9,300,178 B2
(45) Date of Patent: Mar. 29, 2016

(54) STATOR OF ELECTRIC ROTATING MACHINE

(71) Applicant: DENSO CORPORATION, Kariya, Aichi-pref. (JP)

(72) Inventors: Toshimitsu Shiga, Anjo (JP); Hiroaki Takeda, Toyota (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 13/934,920

(22) Filed: Jul. 3, 2013

(65) Prior Publication Data
US 2014/0042836 A1 Feb. 13, 2014

(30) Foreign Application Priority Data
Aug. 10, 2012 (JP) ................... 2012-177701

(51) Int. Cl.
H02K 15/12 (2006.01)
H02K 3/30 (2006.01)
H02K 3/34 (2006.01)

(52) U.S. Cl.
CPC . *H02K 3/30* (2013.01); *H02K 3/345* (2013.01)

(58) Field of Classification Search
CPC ............................. H02K 15/12; H02K 3/345
USPC ....................... 310/215, 45; 29/596
See application file for complete search history.

(56) References Cited

U.S. PATENT DOCUMENTS

| 3,515,923 A * | 6/1970 | Clizbe et al. .................. 310/215 |
| 4,994,700 A * | 2/1991 | Bansal et al. ................. 310/215 |
| 6,147,430 A | 11/2000 | Kusase et al. |
| 2007/0013259 A1 | 1/2007 | Nakamura et al. |
| 2008/0007134 A1 * | 1/2008 | Shimura et al. ............... 310/214 |
| 2012/0256512 A1 * | 10/2012 | Fubuki et al. ................. 310/215 |

FOREIGN PATENT DOCUMENTS

| FR | 2 869 736 A1 | 11/2005 |
| JP | A-55-150744 | 11/1980 |
| JP | A-62-178145 | 8/1987 |
| JP | A-4-138043 | 5/1992 |
| JP | A-2000-50553 | 2/2000 |
| JP | A-2001-178057 | 6/2001 |
| JP | A-2001-211587 | 8/2001 |
| JP | A-2007-28790 | 2/2007 |
| JP | A-2007-336650 | 12/2007 |
| JP | A-2012-16133 | 1/2012 |

OTHER PUBLICATIONS

Jun. 10, 2014 Office Action issued in Japanese Application No. 2012-177701 (with translation).

* cited by examiner

*Primary Examiner* — Hanh Nguyen
(74) *Attorney, Agent, or Firm* — Oliff PLC

(57) ABSTRACT

The stator of a vehicle-use electric rotating machine includes a stator core having slots formed along a circumferential direction thereof, segment conductors having a rectangular cross section and wound on the stator core such that each of the slots accommodates at least two of the segment conductors to form a stator winding, a sheet-like electric insulating member disposed in each of the slots so as to surround the segment conductors accommodated in the slot, the electric insulating member being formed with a plurality of projections projecting toward a wall surface of the slot, and a resin filled in each of the slots so as to impregnate into the electric insulating member.

8 Claims, 11 Drawing Sheets

STATOR OF ELECTRIC ROTATING MACHINE

This application claims priority to Japanese Patent Application No. 2012-177701 filed on Aug. 10, 2012, the entire contents of which are hereby incorporated by reference.

BACKGROUND OF THE INVENTION

1. Field of the Invention

The present invention relates to a stator of an electric rotating machine, especially an electric rotating machine mounted on a passenger car, a truck or the like.

2. Description of Related Art

Generally, as described, for example, in French Patent No. 2869736, a stator of a vehicle-use electric rotating machine is provided with an insulating sheet for insulation between electrical conductors (a stator coil) and a stator core thereof. The insulating sheet is formed with holes at a half area thereof so that the stator coil can be adhered to the insulating sheet by filling impregnating varnish around the stator coil.

In the stator disclosed in the above patent document, since the stator coil is constituted of round wires as electric conductors, there are a lot of inter-conductor spaces. Accordingly the impregnating varnish can easily enter between the electric conductors. However, there is very little clearance between the slot side-wall (the inner side wall of each slot formed in the stator core) and the insulating sheet. Accordingly, since very little impregnating varnish can enter between the slot side-wall and the insulating sheet even when the insulating sheet is formed with holes, the adhering strength between the insulating sheet and the stator coil is insufficient. Accordingly, there is a concern that the insulating sheet and the electric conductors move within each slot especially for the case of a high power vehicle-use alternator in which a large force is applied to its stator coil.

SUMMARY

An exemplary embodiment provides a stator of an electric rotating machine including:

a stator core having slots formed along a circumferential direction thereof;

segment conductors having a rectangular cross section and wound on the stator core such that each of the slots accommodates at least two of the segment conductors to form a stator winding;

a sheet-like electric insulating member disposed in each of the slots so as to surround the segment conductors accommodated in the slot, the electric insulating member being formed with a plurality of projections projecting toward a wall surface of the slot; and a resin filled in each of the slots so as to impregnate into the electric insulating member.

According to the exemplary embodiment, there is provided a stator for an electric rotating machine, in which a sheet-like electric insulating member surrounding segment conductors accommodated in each slot of a stator core is firmly adhered to the stator core.

Other advantages and features of the invention will become apparent from the following description including the drawings and claims.

PREFERRED EMBODIMENTS OF THE INVENTION

Figure 1:
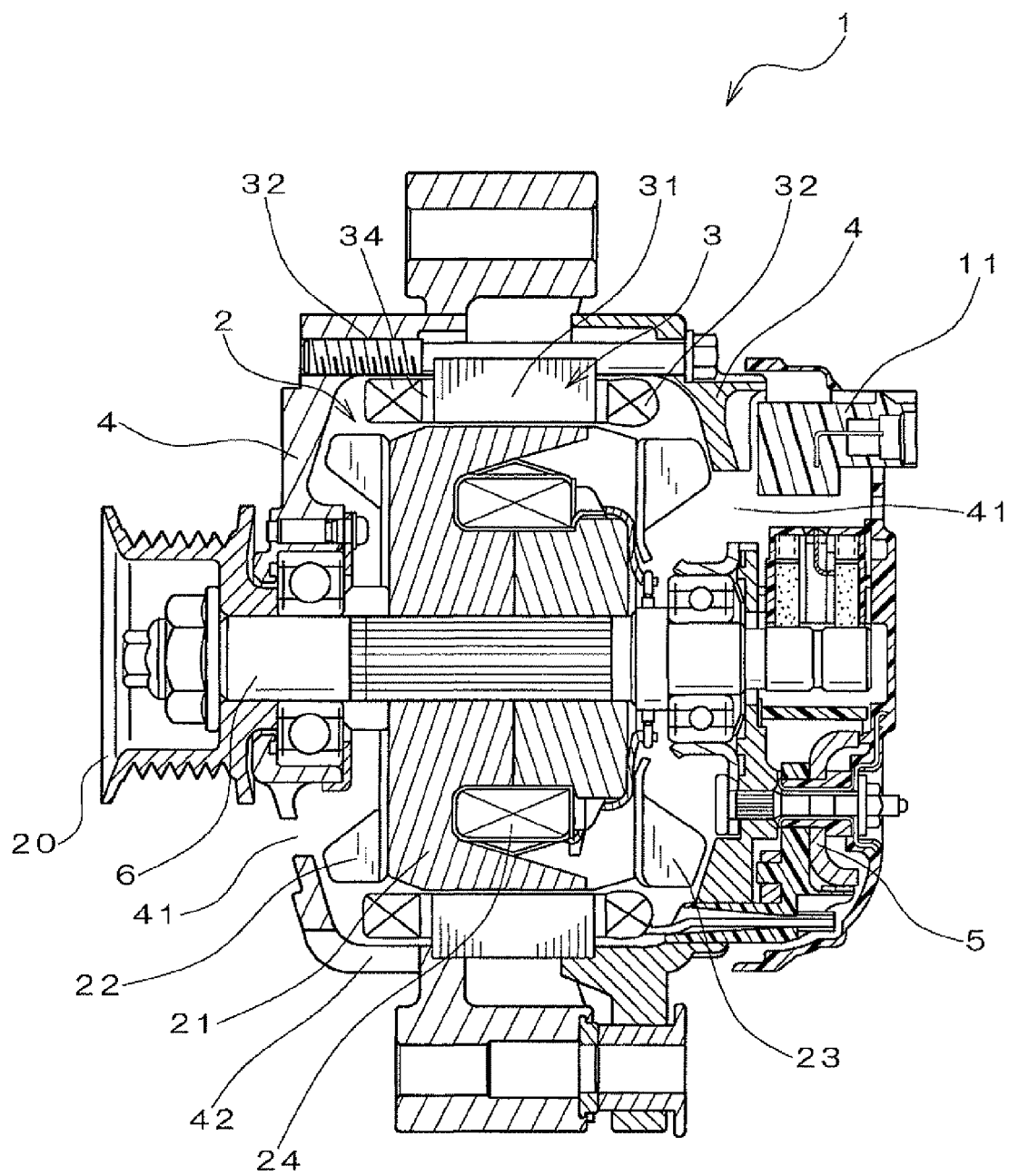
FIG. 1 is a cross-sectional view of a vehicle-use alternator including a stator according to an embodiment of the invention.

FIG. 1 is a cross-sectional view of a vehicle-use alternator 1 including a stator according to an embodiment of the invention. The alternator 1 includes a rotor 2, a stator 3, a frame 4, a rectifier 5 and a regulator 11. The alternator 1 has a pulley 20 for receiving a rotational force from an engine (not shown). The pulley 20 is fixed to a shaft 6 together with the rotor 2. The rotor 2 includes a pair of Lundell-type rotor cores 21 and a field winding 24. The rotor 2 is driven to rotate by the engine. The stator cores 21 are provided with cooling fans 22 and 23, respectively, at their axial end surfaces. The cooling fans 22 and 23 suck air from axial openings 41 formed in the frame 4, and blast it as cooling air toward radial openings 42. A stator winding 32 of the stator 3, the rectifier 5 for rectifying an AC voltage outputted from the stator winding 32 and the regulator 11 for regulating the rectified AC voltage as an output voltage of the alternator 1 are cooled by this cooling air. The shaft 6, which is rotatably supported by the frame 4, is provided with a slip ring on the side near the opposite pulley end thereof. The stator 3 disposed around the outer periphery of the rotor 2 is fixed to the frame 4.

Figure 2:
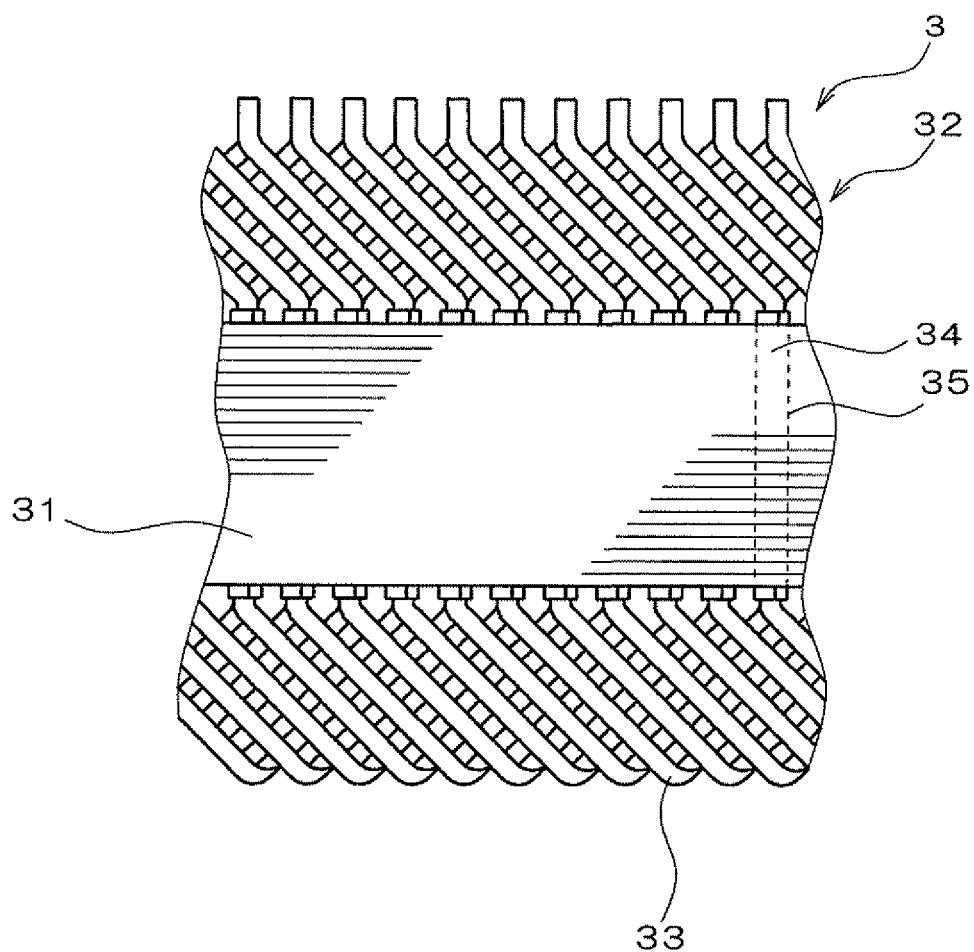
FIG. 2 is a partial development view of the stator of the vehicle-use alternator.

Next, the stator 3 is explained in detail. As shown in FIG. 2, the stator 3 includes a stator core 31, a stator winding 32 and insulators 34 disposed as sheet-like electric insulating members between the stator core 31 and the stator winding 32. The stator core 31 is formed by laminating thin steel plates. The stator winding 32 is wound around slots 34 formed in the stator core 31.

Figure 3:
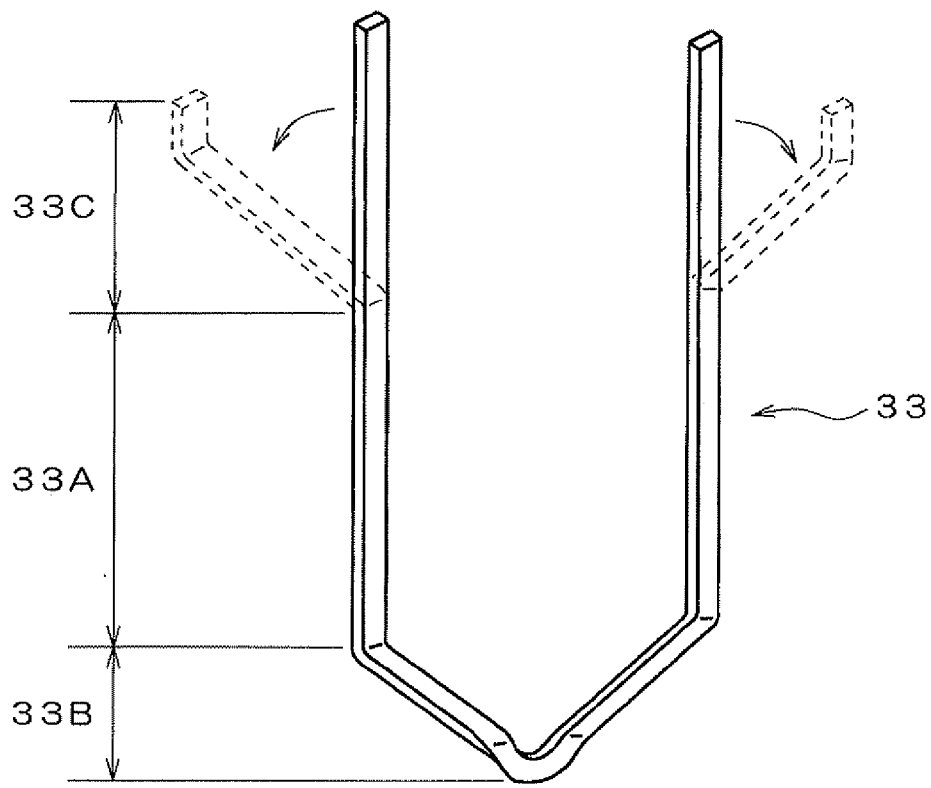
FIG. 3 is a perspective view showing a detailed shape of a segment conductor used in the stator.

The stator winding 32 is constituted of a plurality of U-shaped segment conductors 33 having a rectangular cross section (see FIG. 3). The stator winding 32 is formed as a multiple phase winding by inserting a pair of straight portions of the U-shaped segment conductor 33 respectively into two of the slots 35 spaced apart by a predetermined pitch, bending their ends along the circumferential direction and connecting them to the ends of the straight portions of corresponding other two of the U-shaped segment conductors 33. Each segment conductor 33 includes two in-slot conductors 33A accommodated in the slots 35, and out-of-slot conductors 33B and 33C each connecting to the in-slot conductors 33A and located outside the slots 35 so as to extend in the circumferential direction of the stator core 31. A certain number of the segment conductors 33 having the above described shape are fitted in each of the slots 35 of the stator core 31 so as to be arranged in the radial direction, to constitute the stator winding 32.

Figure 4:
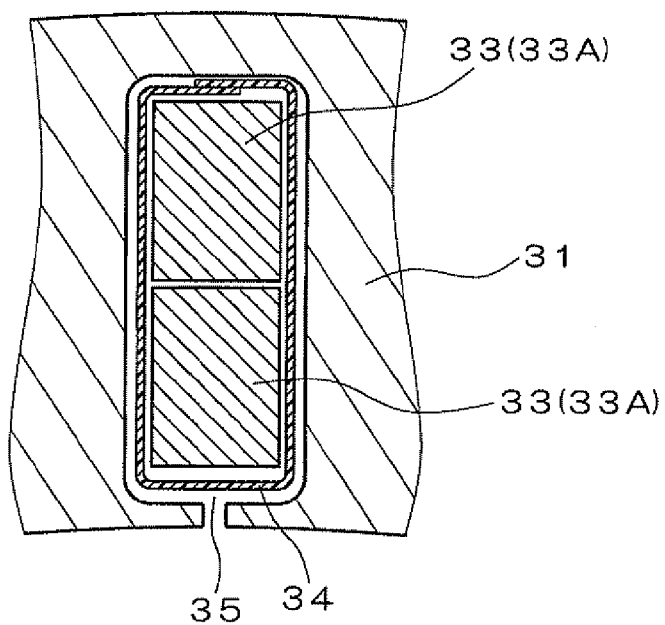
FIG. 4 is a cross-sectional view of the segment conductors accommodated in a slot of the stator core of the stator.

As shown in FIG. 4, in this embodiment, two in-slot conductors 33A are arranged in the radial direction in each slot 35 as two electrical conductors.

Figure 9:
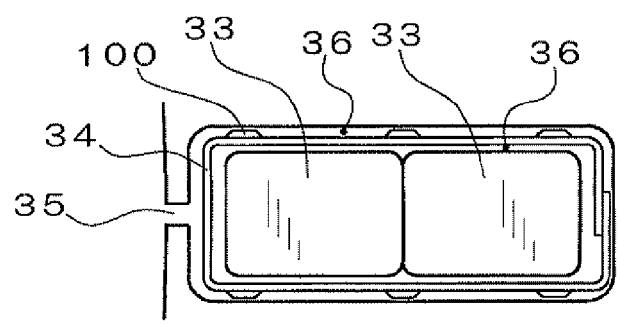
FIG. 9 is a diagram showing a state where the insulator shown in FIG. 6 is accommodated in a slot of the stator together with the segment conductors.

More specifically, two in-slot conductors 33A are disposed as inner and outer conductors in each slot 35, and the insulator 34 is disposed between the inner and outer conductors and the inner wall of the slot 35 so as to cover the entire of these conductors. Each of the in-slot conductor 33A and out-of-slot conductors 33B and 33C is coated with an insulating film made of insulating material such as polyamidimide. Further, an impregnating resin 36 is filled between the insulator 34 and the inner wall of the slot 35, between the insulator 34 and the in-slot conductors 33A and in through-holes formed in truncated cone-penetrating portions 100 (explained later) as shown in FIG. 9. The resin 36 is casted into a space between the insulator 34 and the segment conductors 33 assembled together in each slot 35 of the stator core 31 as shown in FIG. 2, and thereafter is hardened by applying heat.

Figure 5:
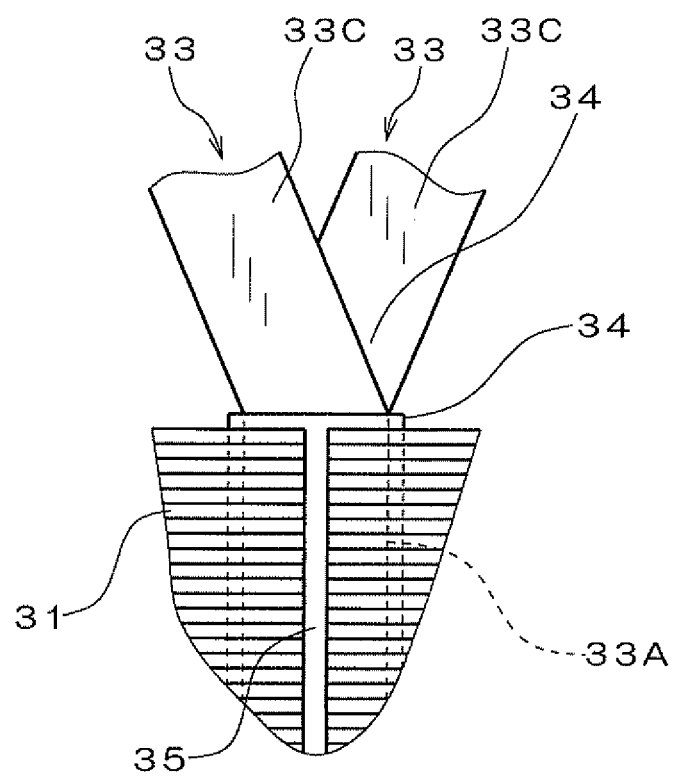
FIG. 5 is a partial enlarged view of an insulator accommodated in a slot of the stator core as viewed from the radially inner side.

Next, the insulator 34 is explained in detail. As shown in FIG. 5, the insulator 34 is accommodated in the stator core 31 together with the in-slot conductors 33A of the segment conductors 33. Apart of the insulator 34 is exposed from the slot 35 to ensure electrical insulation between the segment conductors 33 and the stator core 31. The insulator 34 is formed in an annular shape covering the two in-slot conductors 33A accommodated in the slot 35.

Figure 6:
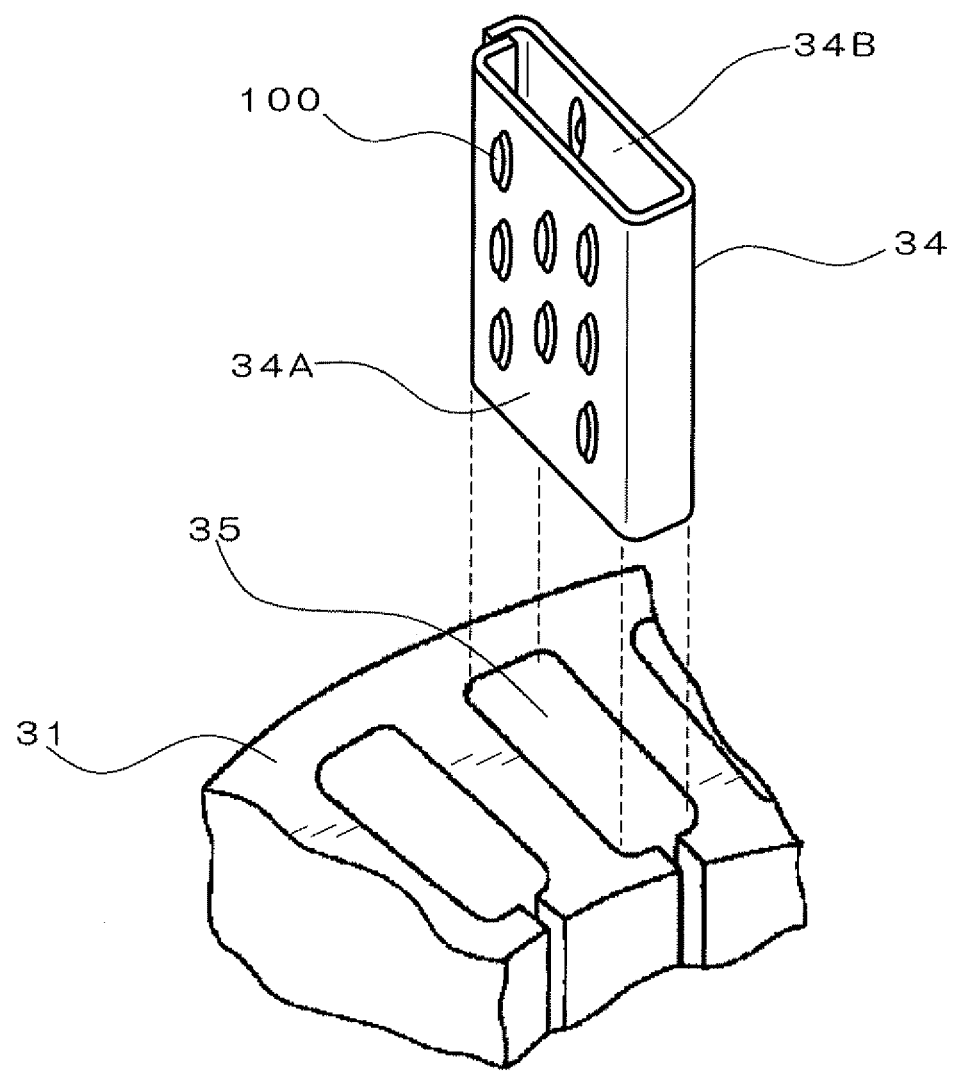
FIG. 6 is a perspective view of the insulator.
Figure 7:
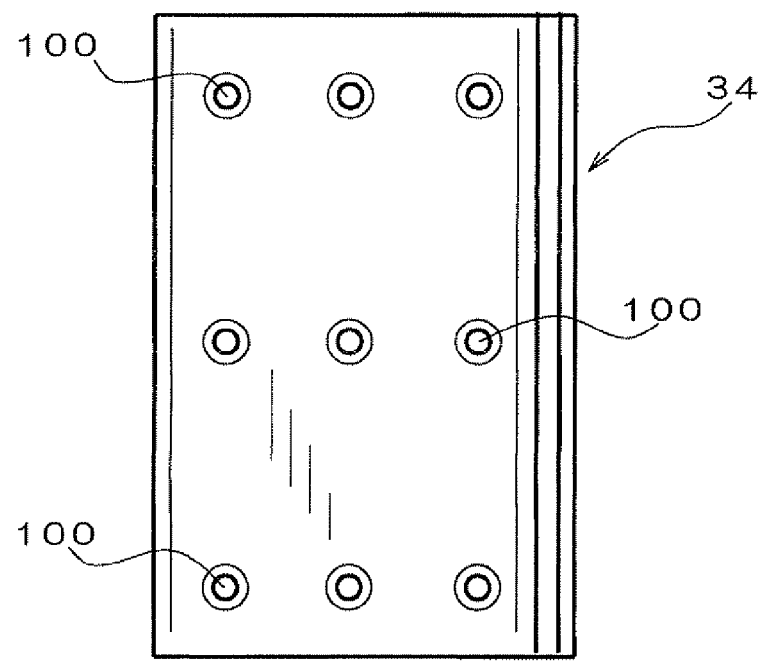
FIG. 7 is a side view of the insulator shown in FIG. 6.

As shown in FIG. 6, the insulator 34 includes a plurality of the truncated conical via portions 100 formed in the side surfaces thereof (side surfaces 34A and 34B shown in FIG. 6 and FIG. 8) facing the two circumferentially opposite wall surfaces of the slot 35. As shown in FIG. 7, each truncated conical via portion 100 has a projection having a shape of a truncated cone and formed with a circular through-hole at its center. The truncated conical via portions 100 are arranged regularly on each of the side surfaces 34A and 343 of the insulator 34. In this embodiment, as shown in FIG. 7, the truncated conical via portions 100 are formed at nine places (three rows by three lines) on each of the side surfaces 34A and 34B. The truncated conical via portions 100 are formed only in the area of each of the side surfaces 34A and 34B, that faces the wall surface of the slot 35 when the insulator 34 is disposed in the slot 35.

The truncated conical via portions 100 may be formed only in one of the side surfaces 34A and 34B. The shape of the through-hole of the truncated conical via portion 100 is not limited to a circle. It may be an ellipse, or a quadrangle.

As shown in FIG. 9, the provision of the truncated conical via portions 100 each having a projection makes it possible to provide clearances between the surfaces of the insulator 34 and the wall surfaces of the slot 35, and to fill the resin in these clearances, so that the insulator 34 can be firmly fixed to the stator core 31. Further, since the truncated conical via portions 100 are formed with the through-holes and the resin can be impregnated through the through-holes, it is possible to sufficiently fill the resin on both sides of the insulator 34. Further, since the projections and the through-holes of the truncated conical via portions 100 can be formed at the same time by press working, for example, the man-hours for manufacturing the insulators 34 can be reduced.

Forming the truncated conical via portions 100 only in the area of each of the side surfaces 34A and 34B, which faces the wall surface of the slot 35 when the insulator 34 is disposed in the slot 35 makes it possible to prevent the creepage distance between the segment conductor 33 projecting from the slot 35 and the stator core 31 from becoming small.

Figure 8:
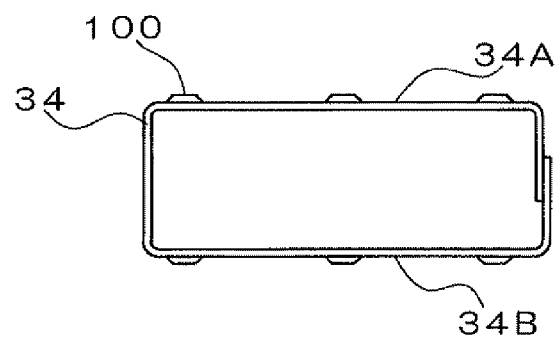
FIG. 8 is a plan view of the insulator shown in FIG. 6.

As shown in FIGS. 7 and 8, the thickness of the resin filled through the through-holes of the truncated conical via portions 100 is larger at the positions at which the through-holes are formed than at the positions at which the through-holes are not formed. Accordingly, it is possible to ensure necessary electrical insulation at the positions at which the through-holes are formed and the insulator 34 is not present.

Figure 10:
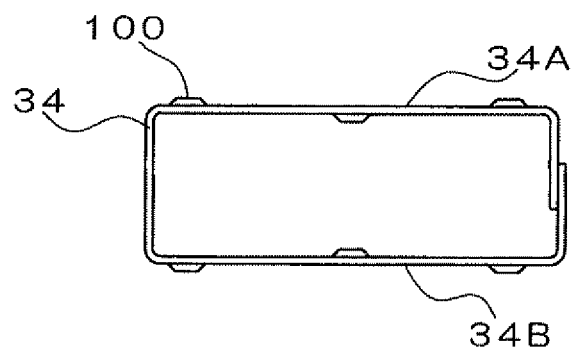
FIG. 10 is a plan view of a modification of the insulator shown in FIG. 6.
Figure 11:
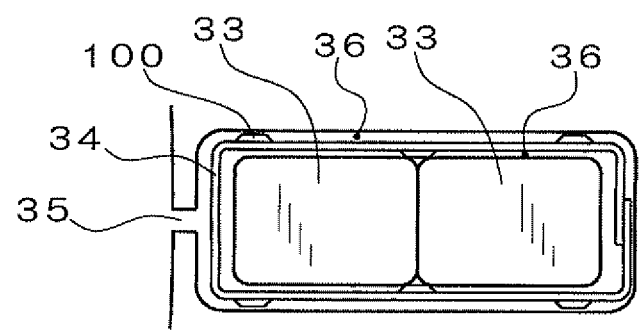
FIG. 11 is a diagram showing a state where the insulator shown in FIG. 10 is accommodated in a slot of the stator together with the segment conductors.
Figure 12:
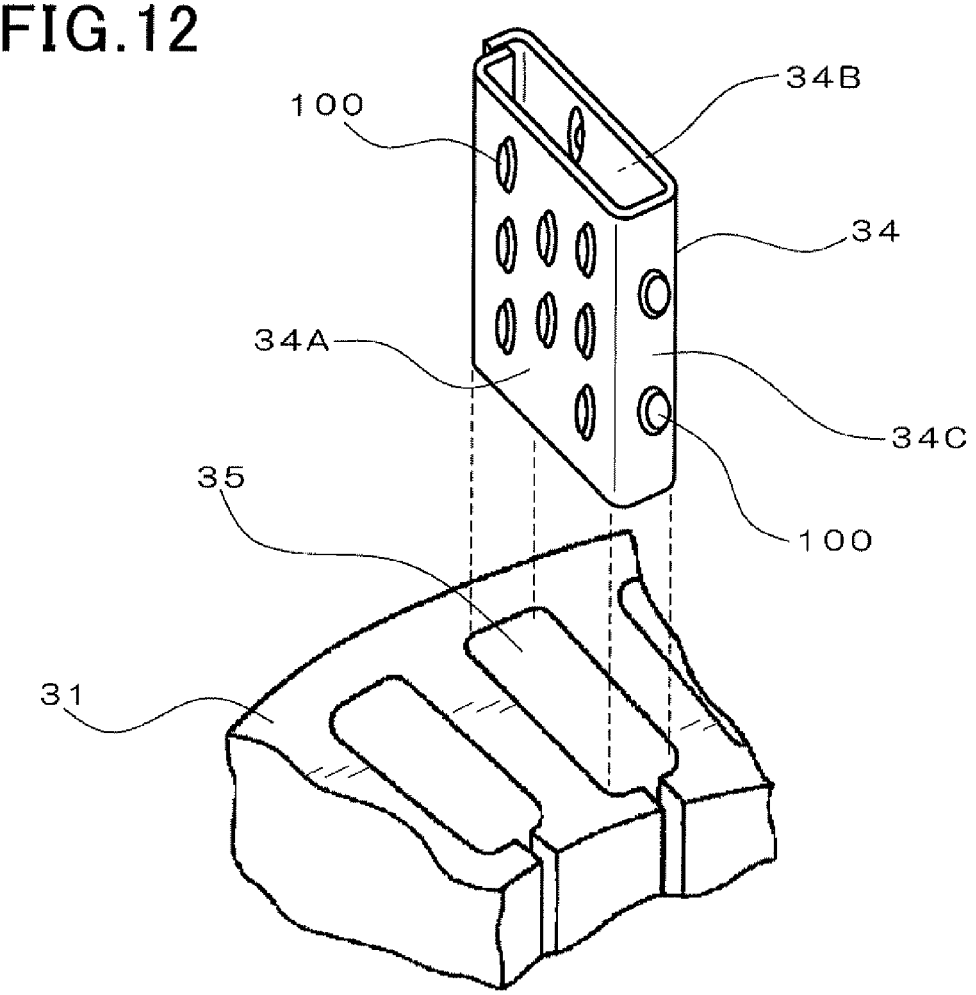
FIG. 12 is a perspective view of a modification of the insulator shown in FIG. 6.

In the above embodiment, all of the truncated conical via portions 100 formed in the side surfaces 34A and 34B of the insulator 34 have the shape projecting toward the outside (toward the wall surface of the slot 35). However, part of the truncated conical via portions 100 formed in the side surfaces 34A and 34B may have a shape projecting toward the inside (toward the segment conductors 33) as shown in FIGS. 10 and 11. In this case, the resin 36 entering between the insulator 34 and the inner wall of the slot 35 can be led toward the segment conductors 33 efficiently.

In the above embodiment, the insulator 34 is formed with the truncated conical via portions 100 only in its side surfaces 34A and 34B. However, the truncated conical via portions 100 may be formed also in the front surface 34c of the insulator 34 extending along the circumferential direction of the stator core 31 as shown in FIGS. 12 to 17.

Figure 13:
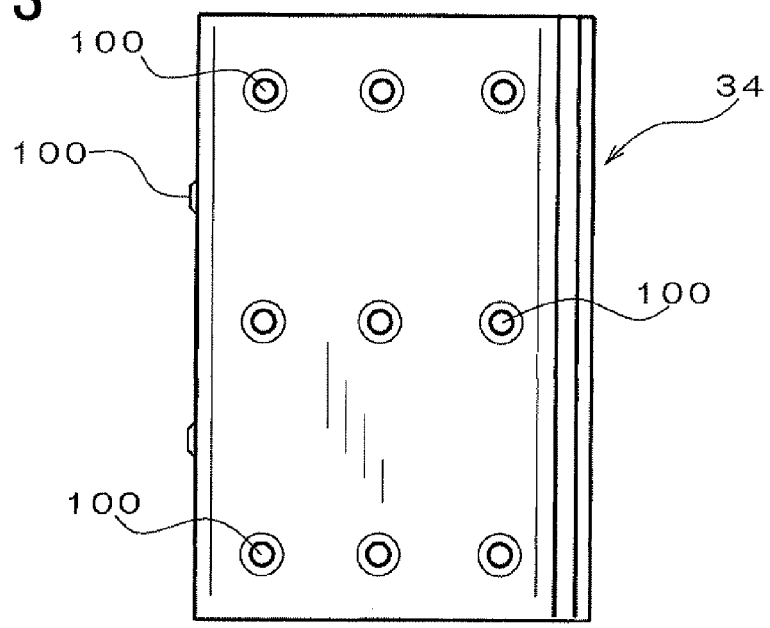
FIG. 13 is a side view of the insulator shown in FIG. 12.
Figure 14:
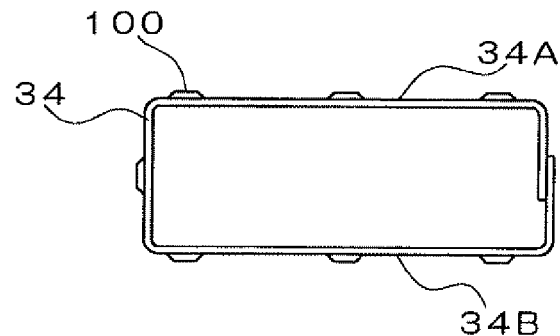
FIG. 14 is a plan view of the insulator shown in FIG. 12.
Figure 15:
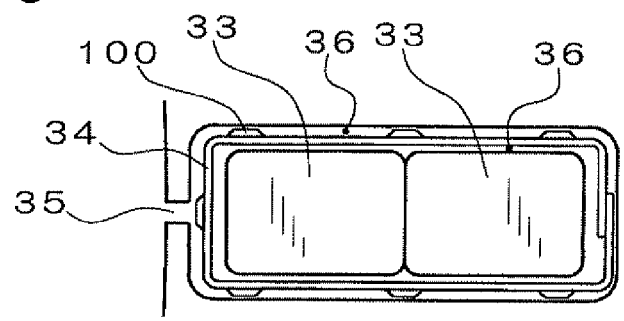
FIG. 15 is a diagram showing a state where the insulator shown in FIG. 12 is accommodated in a slot of the stator together with the segment conductors.
Figure 16:
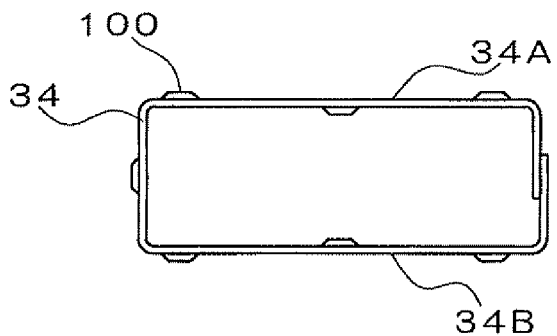
FIG. 16 is a plan view of a modification of the insulator shown in FIG. 12.
Figure 17:
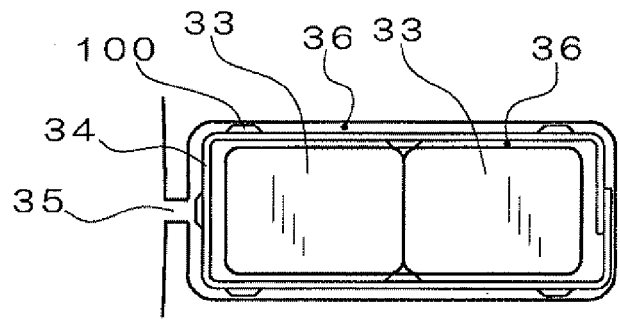
FIG. 17 is a diagram showing a state where the insulator shown in FIG. 16 is accommodated in a slot of the stator together with the segment conductors.
Figure 18:
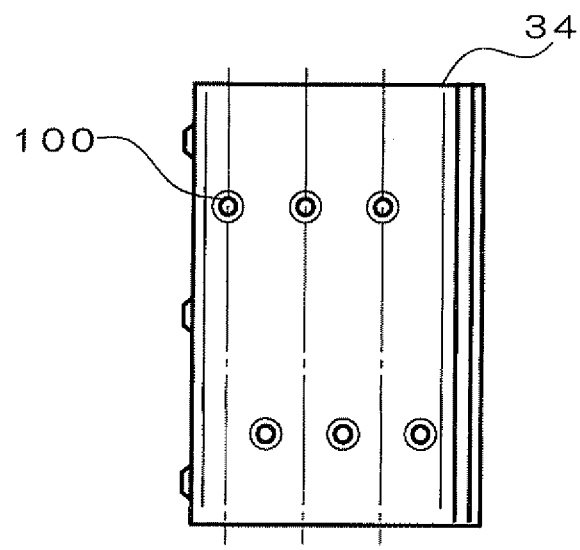
FIG. 18 is a side view of a modification of the insulator shown in FIG. 12.

In this embodiment, as shown in FIGS. 7 and 13, the truncated conical via portions 100 are formed at nine places (three rows by three lines) on each of the side surfaces 34A and 34B, which overlap with one another in the axial direction and in the radial direction of the stator core 31. However, the truncated conical via portions 100 may be formed at places which do not overlap with one another in the axial direction and overlap with one another in the radial direction as shown in FIG. 18. In this case, the resin flowing toward some truncated conical via portions 100 in the axial direction at the time of impregnating the resin can be prevented from being blocked by other truncated conical via portions 100.

Figure 19:
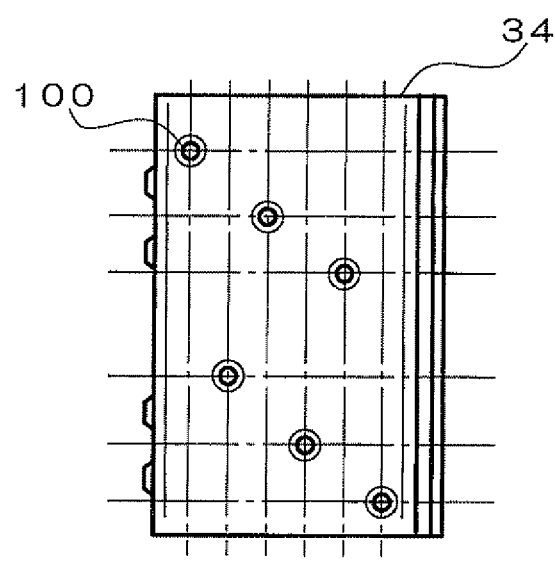
FIG. 19 is a side view of a modification of the insulator shown in FIG. 12.

Further, the truncated conical via portions 100 may be formed at places which do not overlap with one another in the radial direction of the stator core 31, or do not overlap with one another in both the axial direction and the radial direction of the stator core 31 as shown in FIG. 19.

It is a matter of course that various modifications can be made to the above embodiment as described below. The insulator 34 may be formed with truncated conical via portions not formed with a through hole, or may be formed with truncated conical via portion formed with a through-hole at a place other than its projection.

The insulator 34 may be formed with projections formed with a through-hole, which has a shape other than a truncated cone. All of the truncated conical via portions 100 do not necessarily have to be formed in the same shape. Their through holes may have different diameters or shapes.

Figure 20:
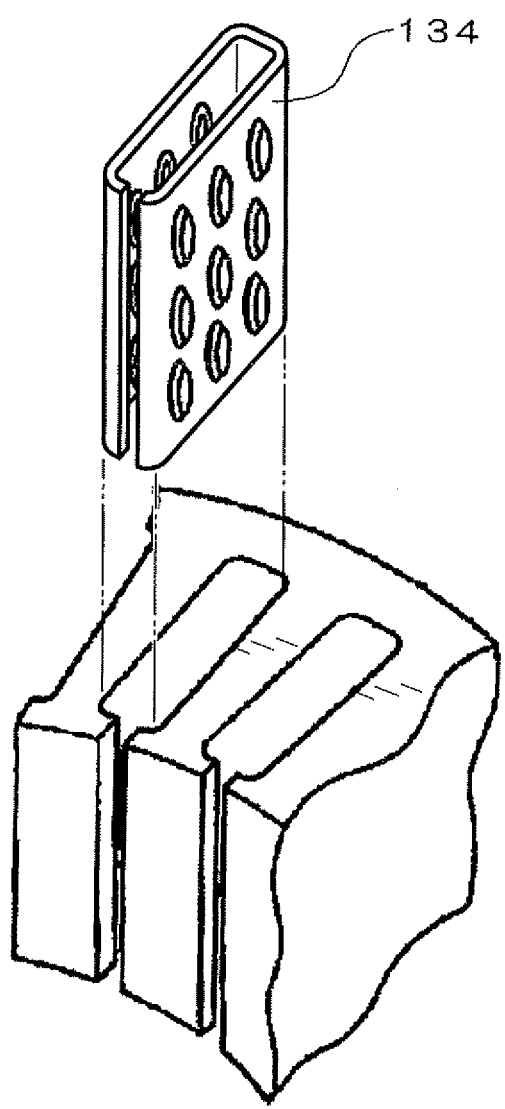
FIG. 20 is a perspective view of a modification of the insulator shown in FIG. 12.

In the above embodiment, the end portions of the insulator 34 are partially overlapped with each other on the radially outer side. However, instead of the insulator 34, an insulator 134 having end portions on the radially inner side as shown in FIG. 20 may be used.

In the above embodiment, the insulator 34 is used for the stator 3 of the vehicle-use electric rotating machine 1. However, the present invention is applicable to an electric rotating machine that can operate as both an alternator and a motor, or only as a motor. Needless to say, the present invention is also applicable to an electric rotating machine other than for a vehicle.

The above explained preferred embodiments are exemplary of the invention of the present application which is described solely by the claims appended below. It should be understood that modifications of the preferred embodiments may be made as would occur to one of skill in the art.

What is claimed is:

1. A stator of an electric rotating machine, the stator comprising:
    a stator core having slots formed along a circumferential direction of the stator core;
    segment conductors having a rectangular cross section and wound on the stator core such that each of the slots accommodates at least two of the segment conductors to form a stator winding;
    a sheet-like electric insulating member disposed in each of the slots so as to surround the segment conductors accommodated in the slot, the electric insulating member being formed with a plurality of first projections projecting toward a wall surface of the slot and a plurality of second projections projecting toward the segment conductors accommodated in the slot, the first and second projections being disposed over a surface of the electric insulating member so as to be located at different positions in an axial direction and a radial direction of the stator core; and
    a resin filled in each of the slots so as to impregnate into the electric insulating member.

2. The stator according to claim 1, wherein the electric insulating member is formed with a plurality of through-holes in which the resin is filled.

3. The stator according to claim 2, wherein the through-holes are formed in the first and second projections.

4. The stator according to claim 3, wherein the first and second projections are formed only in areas of the electric insulating member, which face an inner wall of the slot.

5. The stator according to claim 3, wherein the first and second projections are formed so as to project toward at least one of radially extending opposite wall surfaces of the slot.

6. The stator according to claim 3, wherein a thickness of the resin at positions at which the through-holes are formed is larger than at positions at which the through-holes are not formed.

7. The stator according to claim 3, wherein the first and second projections are disposed at positions which do not overlap with one another in the axial direction of the stator core.

8. The stator according to claim 3, wherein the first and second projections are disposed at positions which do not overlap with one another in the radial direction of the stator core.

* * * * *